US011714895B2

(12) United States Patent
Michalevsky et al.

(10) Patent No.: US 11,714,895 B2
(45) Date of Patent: Aug. 1, 2023

(54) SECURE RUNTIME SYSTEMS AND METHODS

(71) Applicant: Anjuna Security, Inc., Palo Alto, CA (US)

(72) Inventors: Yan Michalevsky, Palo Alto, CA (US); Boris Mittleberg, San Jose, CA (US); Jun Chen, Cupertino, CA (US); Daljeet Singh Chhabra, Sunnyvale, CA (US)

(73) Assignee: Anjuna Security, Inc., Palo Alto, CA (US)

( * ) Notice: Subject to any disclaimer, the term of this patent is extended or adjusted under 35 U.S.C. 154(b) by 628 days.

(21) Appl. No.: 16/516,079

(22) Filed: Jul. 18, 2019

(65) Prior Publication Data

US 2021/0019393 A1    Jan. 21, 2021

(51) Int. Cl.
| | | |
|---|---|---|
| G06F 21/00 | (2013.01) | |
| G06F 21/51 | (2013.01) | |
| G06F 21/72 | (2013.01) | |
| G06F 21/53 | (2013.01) | |
| G06F 11/07 | (2006.01) | |
| G06F 9/445 | (2018.01) | |
| G06F 21/57 | (2013.01) | |

(52) U.S. Cl.
CPC .......... *G06F 21/51* (2013.01); *G06F 9/44521* (2013.01); *G06F 11/0793* (2013.01); *G06F 21/53* (2013.01); *G06F 21/575* (2013.01); *G06F 21/72* (2013.01)

(58) Field of Classification Search
CPC ........ G06F 21/53; G06F 21/575; G06F 21/72; G06F 21/51; G06F 11/0793; G06F 9/44521
See application file for complete search history.

(56) References Cited

U.S. PATENT DOCUMENTS

| | | | | |
|---|---|---|---|---|
| 2010/0192130 A1* | 7/2010 | Hawblitzel | ......... | G06F 9/44589 717/126 |
| 2012/0198514 A1* | 8/2012 | McCune | ................. | G06F 21/57 726/1 |
| 2014/0006711 A1* | 1/2014 | Xing | ..................... | G06F 3/0623 711/118 |
| 2014/0189246 A1* | 7/2014 | Xing | ........................ | G06F 21/53 711/135 |
| 2015/0033354 A1* | 1/2015 | Wichmann | .......... | G06F 9/44521 726/26 |
| 2015/0222637 A1* | 8/2015 | Hung | .................. | H04L 63/0272 726/1 |
| 2015/0278528 A1* | 10/2015 | Xing | ........................ | G06F 21/53 726/26 |
| 2016/0042191 A1* | 2/2016 | Enck | ..................... | G06F 21/629 726/17 |

(Continued)

*Primary Examiner* — Ghazal B Shehni
(74) *Attorney, Agent, or Firm* — David R. Stevens; Stevens Law Group

(57) ABSTRACT

Example secure runtime systems and methods are described. In one implementation, a secure runtime system is configured to execute multiple applications in a secure manner. The secure runtime is associated with a secure enclave defined by a hardware device. A secure application loader is configured to load an application into the secure runtime system and an OS bridge is configured to provide OS services to the application.

20 Claims, 7 Drawing Sheets

(56) References Cited

U.S. PATENT DOCUMENTS

2016/0077850 A1\* 3/2016 Andrus ................ G06F 9/4552
                                                        717/139
2017/0289151 A1   10/2017 Shanahan et al.
2018/0114013 A1    4/2018 Sood et al.
2020/0257794 A1\*  8/2020 Kim ........................ G06F 21/53

\* cited by examiner

SECURE RUNTIME SYSTEMS AND METHODS

TECHNICAL FIELD

The present disclosure relates to secure runtime systems and methods for use in computing environments.

BACKGROUND

Cloud-based computing environments have changed traditional approaches to securing various computing devices and enterprises. As computing and data storage activities are performed by remote devices, security and privacy issues arise because the remote devices are typically controlled by another organization and may be less secure than local devices.

Existing systems encrypt stored data and encrypt data prior to communication to another device or system. However, these existing systems generally do not encrypt data when it is being used by an application or other process. When data is used by applications or processes, it generally needs to be decrypted for runtime processing. This decrypted data presents a security issue during runtime by potentially exposing the decrypted data to unauthorized users or unauthorized systems.

Accordingly, what is needed is an improved approach for securing data during runtime processing.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
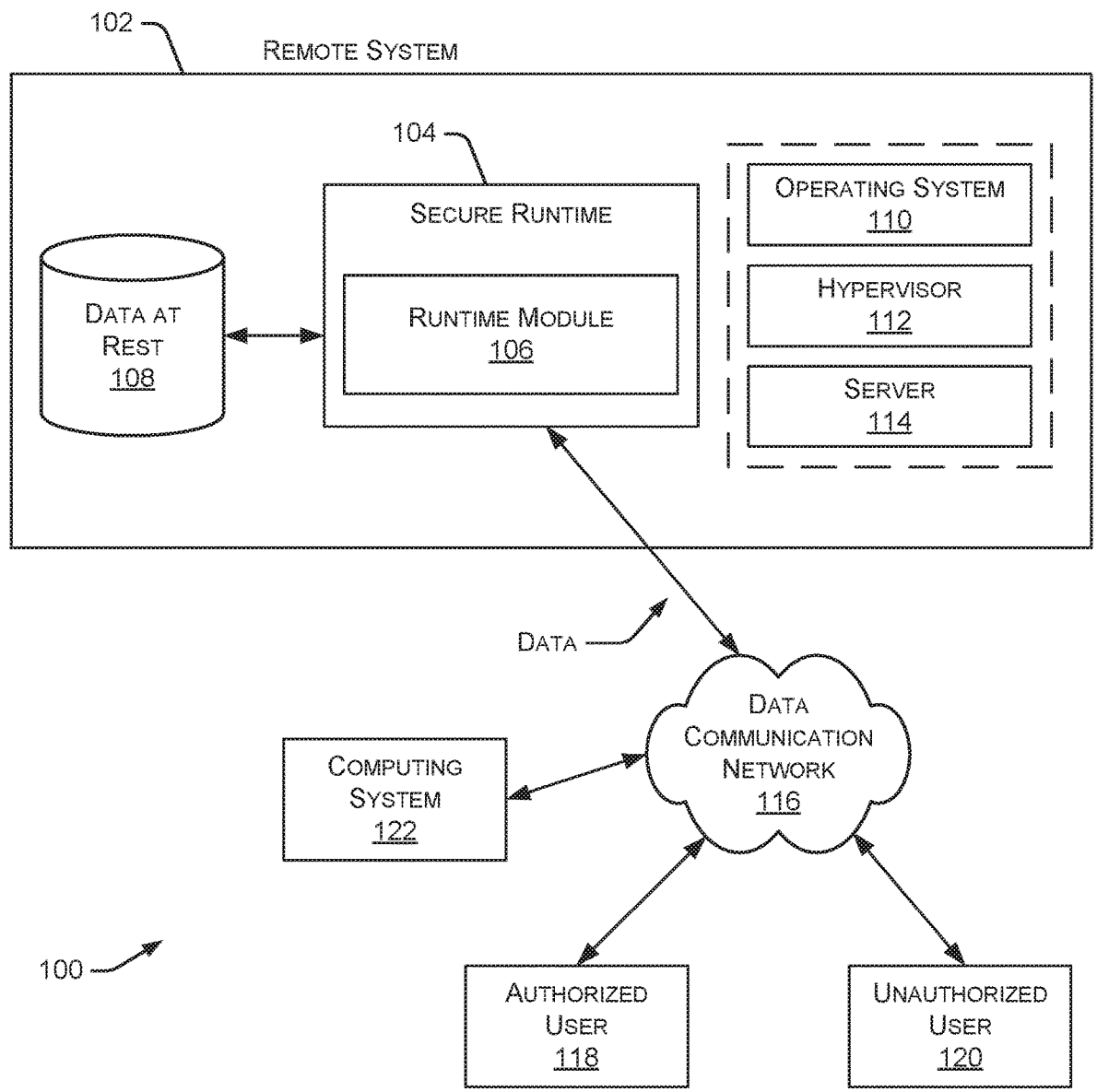
FIG. 1 is a block diagram illustrating an example environment in which the described systems and methods are implemented.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

At least some embodiments of the disclosure are directed to computer program products comprising such logic (e.g., in the form of software) stored on any computer useable medium. Such software, when executed in one or more data processing devices, causes a device to operate as described herein.

The systems and methods described herein provide security for one or more applications and the data associated with those applications. In some embodiments, the security of an application and its data depends on the security of the layers on which the application resides.

In some implementations, an application is executed in a container or a virtual machine (VM) that is managed by a hypervisor. The hypervisor runs on top of a host operating system (OS), which may operate in a cloud provider's physical machine. In this type of implementation, the application is exposed to threats in the container or VM. The application also has to trust the IT stack that includes the hypervisor, the host OS, and the physical machine. For example, the application is exposed to an unauthorized user who obtains root access to the VM, access to the hypervisor process, privileged access to the host OS (which enables access to the hypervisor), or physical access to the physical machine, which allows the unauthorized user to access the process executing the client task, access its memory space, and access the processed data.

The systems and methods described herein establish trust in an outsourced or untrusted infrastructure by providing the required primitives to establish and verify trust. In particular, the described secure runtime systems and methods secure the runtime environment by creating a trusted execution environment (TEE). These systems and methods provide privacy by preventing unauthorized users from seeing protected data or modifying the data.

The systems and methods described herein provide a secure runtime that prevents unauthorized users or systems from accessing an application, the application code, or data associated with the application. Further, the secure runtime enables unmodified applications to take advantage of trusted execution environments. This eliminates the need to specifically modify applications to benefit from a trusted execution environment. The described systems and methods also prevent unauthorized users or systems from tampering with the execution of the application. For example, in a cloud-based environment, a remote client may deploy sensitive workloads into a secure runtime and the remote client communicates with the secure runtime via a secure channel. The secure channel is typically authenticated and encrypted. This configuration provides a level of trust so the remote client can confirm that it is communicating with a secure runtime. Further, this configuration prevents tampering with execution of the application or the data.

In some embodiments, the described systems and methods provide application and data security using secure enclaves, which have been introduced into many processors by hardware manufacturers. For example, some secure enclaves allow an application to execute in an environment that is isolated from the host, but executing on the same physical machine. In some implementations, the secure enclave is an encrypted partition of the memory. Particular secure enclaves use a hardware root-of-trust and application isolation within a hardware processor to protect the application and its sensitive data. The secure enclave supports execution of an application so that its contents and data are inaccessible by other users, systems, or entities. The secure enclaves block access to the application or data by users on a guest OS, the hypervisor, or the host OS. Thus, instead of creating a secure perimeter around a VM or host, the secure enclave provides a secure perimeter around the individual applications using well-defined hardware guarantees.

In some embodiments, the secure enclaves provided by the hardware manufacturers require considerable understanding of intricate design details and cryptography concepts. In particular situations, for existing applications to utilize a secure enclave, they may require rearchitecting and refactoring.

In some embodiments, the systems and methods described herein simplify the utilization of secure enclaves by abstracting away low-level details using an API (Application Programming Interface). These systems and methods allow systems (e.g., enterprises) to securely run existing applications without modification inside remote secure enclaves. The secure runtime systems discussed herein provide a platform for secure and private computing in a public cloud environment. For example, the secure runtime systems enable enterprises to execute applications on a public cloud infrastructure while maintaining confidentiality and integrity of the application and its associated data. Thus, an entity executing applications on the public cloud infrastructure can trust an otherwise untrustworthy public cloud knowing that the applications and data are secure.

FIG. 1 is a block diagram illustrating an example environment 100 in which the described systems and methods are implemented. A remote system 102 is coupled to one or more authorized users 118, one or more unauthorized users 120, and one or more computing systems 122 via a data communication network 116. Data communication network 116 includes any type of network topology using any communication protocol. Additionally, data communication network 116 may include a combination of two or more communication networks. In some embodiments, data communication network 116 includes a cellular communication network, the Internet, a local area network, a wide area network, or any other communication network.

Computing system 122 includes any type of computing device that interacts with remote system 102. In some embodiments, remote system 102 may be a cloud-based computing system that is accessible by computing system 122 to execute various operations on behalf of computing system 122. In some embodiments, remote system 102 includes a secure runtime 104 and a data storage device 108 that stores data at rest. Remote system 102 may also include one or more virtual machines that are hosted by (and implemented on) one or more servers 114, each of which implements one or more operating systems 110 and implements one or more hypervisors 112.

Secure runtime 104 provides a platform for secure and private computing in a public cloud environment. Secure runtime 104 may include a runtime module 106, as discussed herein. In some embodiments, secure runtime 104 secures the runtime server applications (and the associated data) running inside individual secure enclaves on a host. Secure runtime 104 also provides memory isolation by isolating memory associated with an application from other components and processes running on the host. This isolation also includes isolating the memory from the operating system. In some embodiments, the data associated with a particular application stays within the secure enclave when the data is not encrypted. The data is always encrypted before it is communicated out of the secure enclave. Additionally, other systems and users cannot access the memory, even if they have root or physical access to the host system.

In some embodiments, secure runtime 104 also ensures a trusted channel to a back-end server application, which provides security by validating that the expected code is executing in the expected Trusted Execution Environment. Additionally, the use of remote attestation provides computing system 122 and other enterprises with a cryptographic assurance that their clients are communicating directly with remote system 102 and no other entity, system, or user can access the applications and their associated data.

Figure 2:
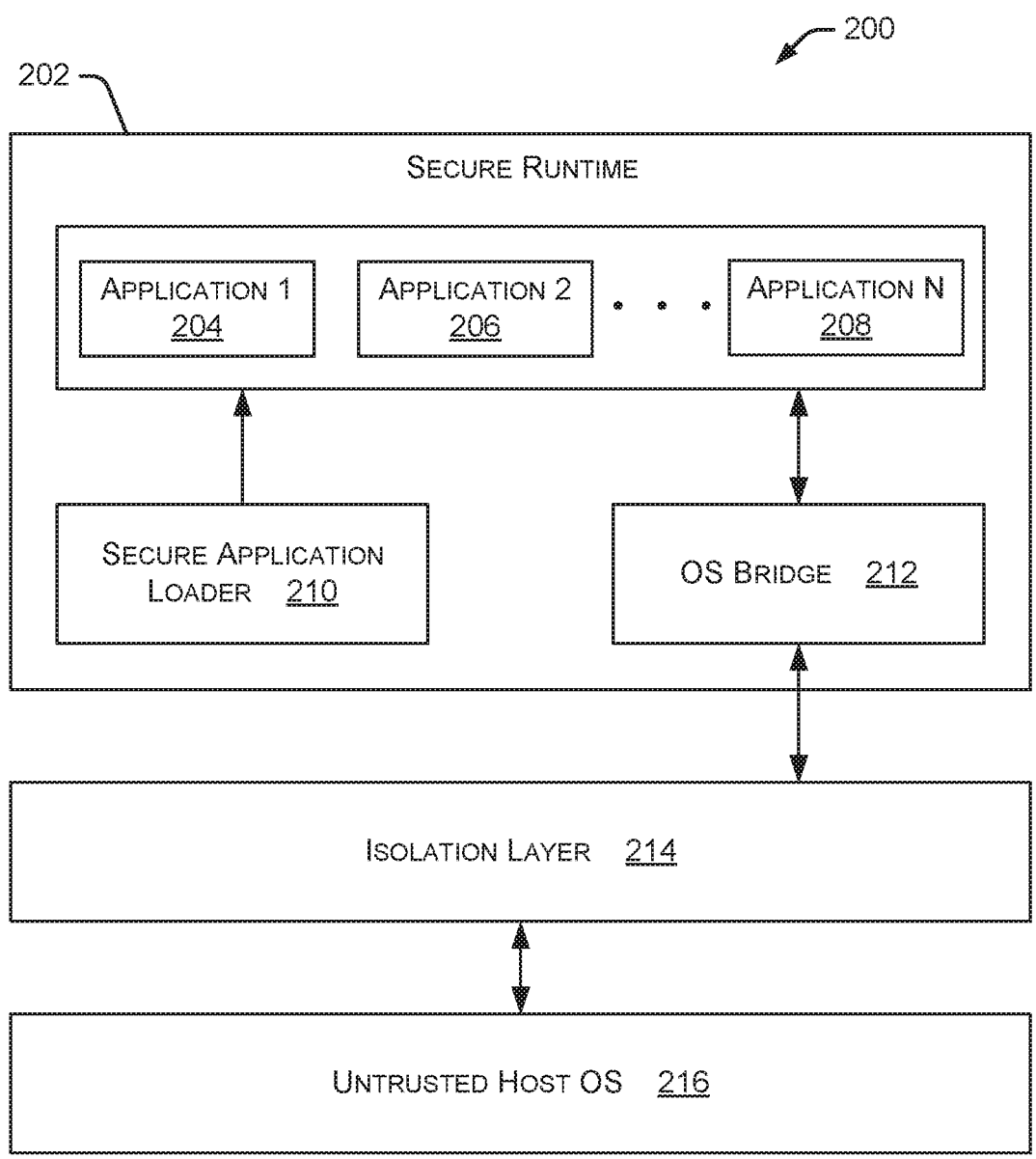
FIG. 2 illustrates an embodiment of a secure runtime structure.

FIG. 2 illustrates an embodiment of a secure runtime structure 200. A secure runtime 202 includes any number of applications 204, 206, and 208. In some embodiments, each application 204, 206, and 208 is executing in a separate enclave. In other embodiments, two or more of applications 204, 206, and 208 are executing in the same secure enclave. In particular implementations, for applications that use shared memory and are compiled as Position Independent Code (PIC), the described systems and methods may run two processes in a single secure enclave. Secure runtime 202 also includes a secure application loader 210 (also referred to as a "router") and an OS bridge 212. In some embodiments, secure application loader 210 is capable of running binary executables in an isolated and shielded environment. Secure application loader 210 may load each application 204-208 into secure runtime 202 along with all of the libraries that each application depends on to execute.

An isolation layer 214 is positioned between secure runtime 202 and an untrusted host OS 216. This isolation layer 214 operates to isolate the applications 204, 206, and 208 from untrusted host OS 216. Although isolation layer 214 is shown separately in FIG. 2, it represents the underlying hardware or virtualization technologies provided by specific hardware processors. Isolation layer 214 is not necessarily a specific entity. Instead, isolation layer 214 represents the isolation provided by the technique of loading applications in a manner that the applications are executing in an enclave and the applications are isolated from any other execution content. In some embodiments, isolation layer 214 is based on hardware features that provide hardware-grade security and privacy. Example hardware features include SGX (Software Guard Extensions) and SEV (Secure Encrypted Virtualization).

As discussed herein, each application 204-208 can create an isolated encrypted memory area that is not accessible to (or visible to the) kernel. In some embodiments, the systems and methods described herein create a small kernel for each application 204-208 that provides the OS services needed by each application, but executing within the secure enclave. For example, OS bridge 212 may provide OS services to applications 204-208. These OS services may include writing to a disk or other storage system, starting a network connection, and other types of system calls. Additionally, OS bridge 212 may apply encryption to data and other information used by applications 204-208 within secure runtime 202.

In some embodiments, secure runtime structure 200 is used as a cloud-based backend system which provides seamless migration of workloads between, for example, computing system 122 and remote system 102. In a specific implementation, secure runtime structure 200 includes one or more "enclaved" applications that support high-level language runtimes, which provides simplicity and general functionality for processing data. This allows a secure webserver to serve sensitive content directly to an authorized user 118 in a manner that prevents the cloud-based system operator from accessing the content or other data.

As discussed herein, secure runtime 202 allows sensitive applications to execute securely in remote locations and within the public cloud. Secure runtime 202 provides flexibility by avoiding the need for rigid server security zones, while minimizing the reliance on hardware security modules. In some embodiments, secure runtime 202 enables secure deployment of unmodified applications, including secure communication between multiple secure enclaves, resource allocation, and monitoring.

In some implementations, secure runtime 202 protects against "zero-day exploits" by executing applications inside a secure enclave. These applications are protected from malware that penetrates the host with escalated privileges. Thus, secure runtime 202 provides a perimeter around the individual executing application instead of a larger perimeter around a virtual machine or a host.

In particular embodiments, secure runtime 202 provides a benefit to privately hosted clouds and data centers through security and operational flexibility. For example, secure runtime 202 allows remote clients to communicate directly with the secure micro services, which reduces critical operational concerns. In some embodiments, secure runtime 202 also avoids the need for rigid security zones that might result in over-provisioned or underutilized server infrastructure. The systems and methods described herein enable flexible server deployment with optimal server utilization to lower IT infrastructure and operational costs.

In some embodiments, the systems and methods described herein can work with any hardware device that supports secure enclaves. These systems and methods offer a common API that works with any hardware device from any manufacturer. The use of a common API simplifies the creation and management of systems that support execution of one or more applications in secure enclaves. Rather than learning specific techniques associated with each type of hardware device, the common API allows a developer, system administrator, or other person or entity to learn a single API that works on all hardware devices.

In some embodiments, the common API that is presented to the multiple applications is the native OS API, such as the system-call API. System calls are used by binary executables to request services from the OS that is running the binary executable. The systems and methods described herein intercept these system calls and either pass them through to the OS or handle them in a special way depending on the type of operation requested. An example operation includes file operations in which a user using a runtime may choose to encrypt/decrypt certain files accessed or created by the application in a manner that is transparent to the application. Another example operation is a network communication where many applications do not provide built-in support for encrypting their network communication. The described systems and methods intercept communication over sockets/pipes and encrypt it on the fly if requested by the user. Finally, an application often needs a reliable source of entropy and will refer to the operating system. However, a compromised operating system may purposely provide low entropy results. Thus, the runtime security solution provides a high-entropy random input generated by the trusted execution environment.

In virtualized environments, system calls may be intercepted by a hypervisor and passed to the host OS via hypercalls, which is an interface between the guest virtual machine and the part of the hypervisor running on the host. In these virtualized environments, the systems and methods described herein intercept system call by executing the application within a hypervisor and handling the SYSCALL instruction as a privileged instruction which is trapped by the guest kernel that may handle it internally or pass it through to the hypervisor.

In some embodiments, by intercepting the system calls, the described systems and methods do not require special adaptation for applications to run on top of different hardware types or different hypervisor platforms.

Any number of methods may be used to intercept system calls. For example, system calls can be intercepted using a patched version of glibc, a library used by many Linux applications. Other methods include handling SIGILL signals to intercept a system call originated from within an enclave.

In some embodiments, system calls are illegal within the context of an enclave and cause an execution fault which is intercepted by a fault handler (e.g., the fault handler associated with the systems and methods described herein). For example, applications may be linked statically, and directly invoke a system call instruction, so that dynamic linking with a patched libc is replaced with directly intercepting the system call instruction by using an execution fault. The fault handler delegates the signal indicating which system call was attempted to a trusted handler inside the enclave. This trusted handler handles the system call according to its type. For example, the trusted handler may 1) delegate the system call to the OS, or 2) encrypt data before it leaves the enclave to the OS.

In some embodiments, the described systems and methods implement system call interception optimization. One method of interception based on faults causes a certain performance penalty because it causes an enclave-exit. This is optimized by binary rewriting in runtime and replacing the original syscall instruction with a trampoline—a set of instructions that redirect execution to specific system-call handling code. This approach requires a modification to the compiler or the libc library that invokes the syscall instruction. For example, in the case of the Go language, the Go compiler source code is modified to include 11 NOP instructions after each SYSCALL instruction, which leaves enough room for the binary rewriting performed by the systems and methods described herein. In the case of dynamically linked applications that link with a standard libc library, the systems and methods modify GLIBC in a similar manner by including NOPs after each SYSCALL instruction. This approach results in a simple patch that enables the systems and methods to support multiple versions of GLIBC or Go with minimal changes to the code.

To properly mimic the operating system to an application running in one of the environments discussed herein, the described systems and methods exhibit the same semantics in terms of stack management. When an application normally invokes a system call, it can expect the stack to not change until the return of that system call. However, some existing library operating systems do not properly handle this detail, which may result in failures. To provide proper semantics, the described systems and methods 1) switch to a different stack once a syscall instruction is invoked, 2) carry out the system call servicing on that separate stack, and 3) switch back to the original stack before returning to the application.

Figure 3:
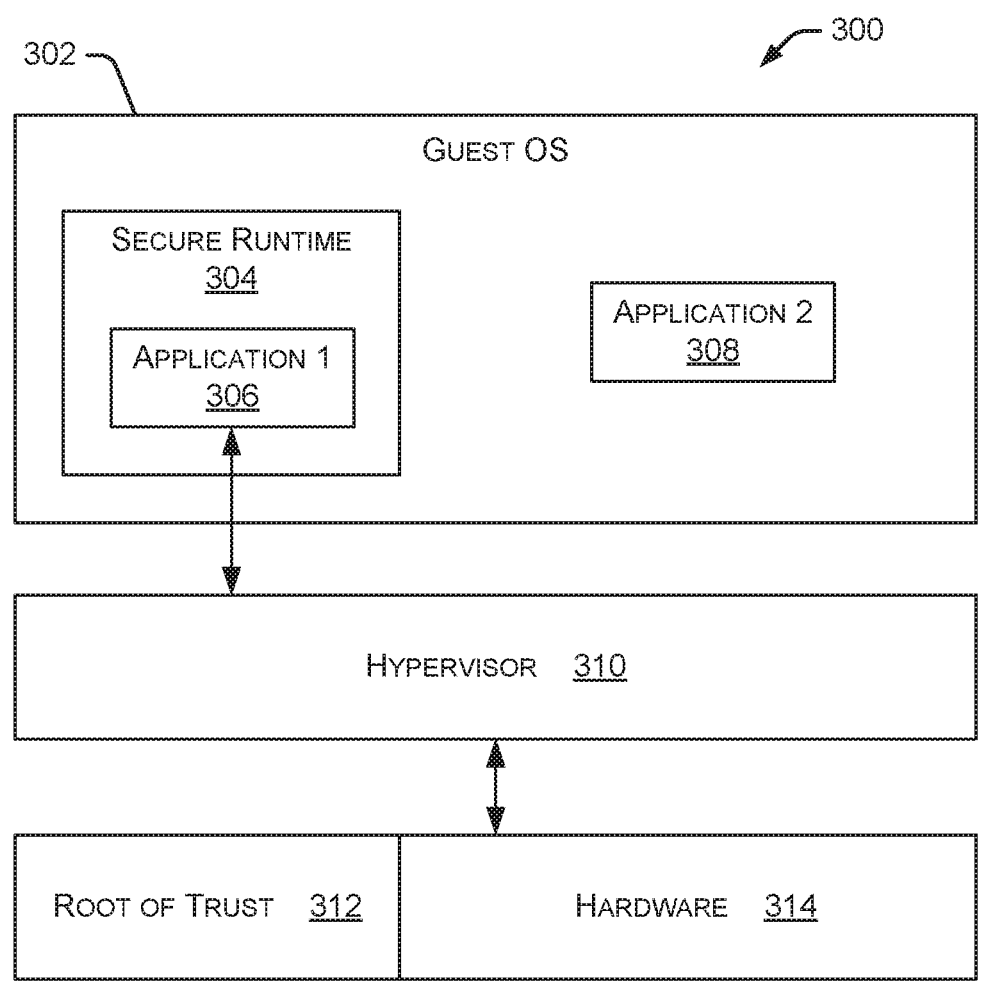
FIG. 3 illustrates an embodiment of a host OS implementing a secure runtime structure.

FIG. 3 illustrates an embodiment of a host OS implementing a secure runtime structure 300. A guest OS 302 includes a secure runtime 304 with a first application 306 executing within secure runtime 304. A second application 308 is executing within guest OS 302. As shown in FIG. 3, application 306 is executing within secure runtime 304 and is, therefore, protected from any malicious attempt to access its data by the other application 308 that is not executing within secure runtime 304.

In the example of FIG. 3, a hypervisor 310 is coupled to guest OS 302. Additionally, a root of trust 312 is associated with a hardware component or device 314. A root of trust is a set of functions or code in a trusted computing module of hardware 314 and is always trusted by the OS. The example of FIG. 3 represents the configuration of a secure enclave in which the root of trust 312 is provided by a manufacturer of hardware 314. In other embodiments that are configured as a virtual enclave, the root of trust 312 is associated with hypervisor 310.

Figure 4:
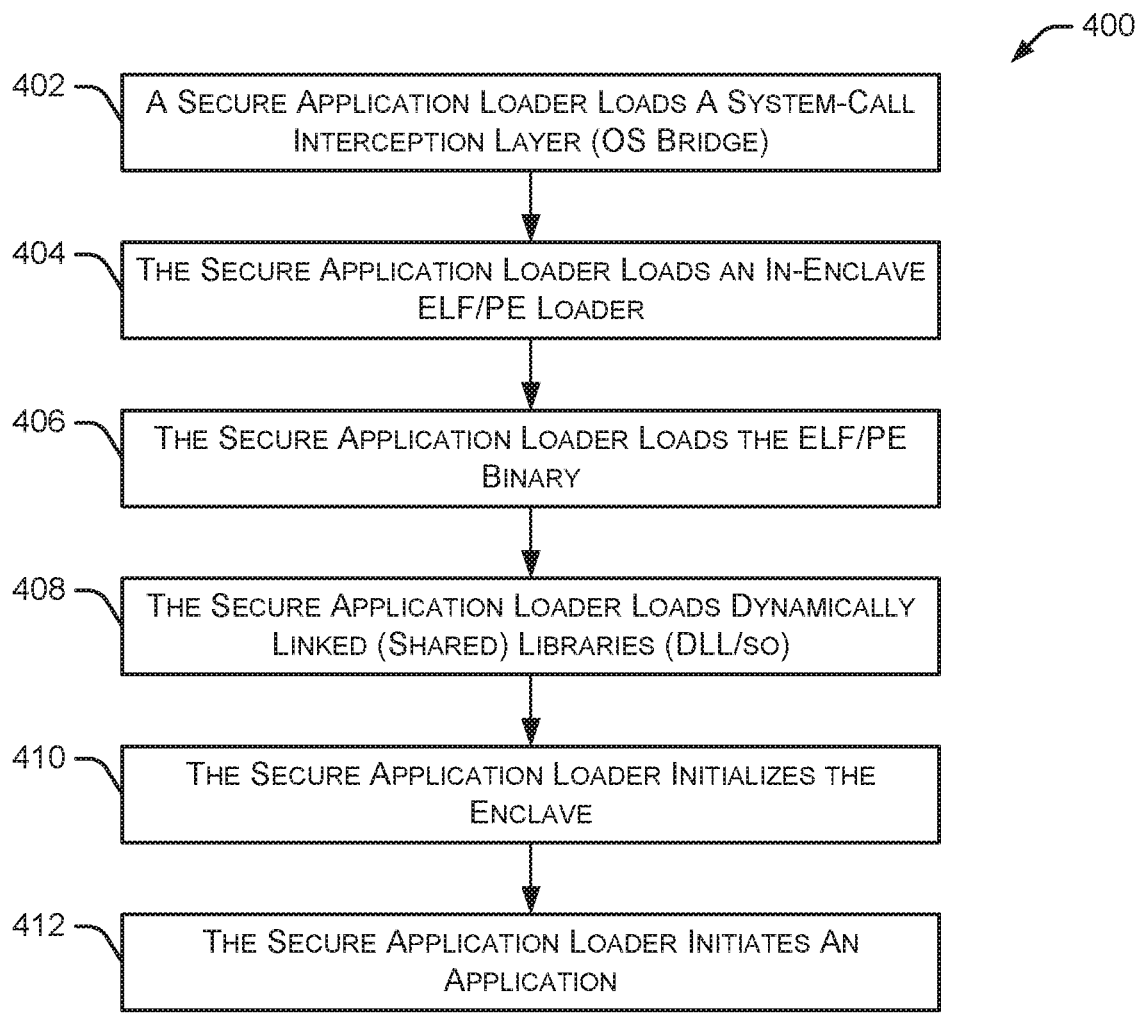
FIG. 4 illustrates an embodiment of a method for setting up an application in the secure runtime.

FIG. 4 illustrates an embodiment of a method 400 for setting up an application in the secure runtime. Initially, a secure application loader (e.g., secure application loader 210 in FIG. 2) loads 402 a system-call interception layer in the OS bridge (e.g., OS bridge 212 in FIG. 2). The secure application loader also loads 404 an in-enclave ELF/PE (Executable and Linkable Format/Portable Executable) loader. Method 400 continues as the secure application loads 406 the ELF/PE binary. The secure application loader further loads 408 dynamically linked (shared) libraries (DLL/so (Dynamic-Link Library/shared objects)). The secure application loader then initializes 410 the enclave and initiates 412 an application in the secure runtime or enclave.

In some embodiments, there is a loader located outside the secure enclave that loads the enclave contents. At this point in time, the application is not ready to execute because the linking, relocation, and all the work performed by the loader have not been performed yet. To perform those activities, a trusted loader is loaded into the secure enclave. The trusted loader takes the application binary and loads it similarly to what the operating system loader does. This enables the described systems and methods to load a regular ELF/PE binary in to the secure enclave, and have it measured and attested independent of the eventual layout of the code and data in-memory after loading (which could be different each time).

Figure 5:
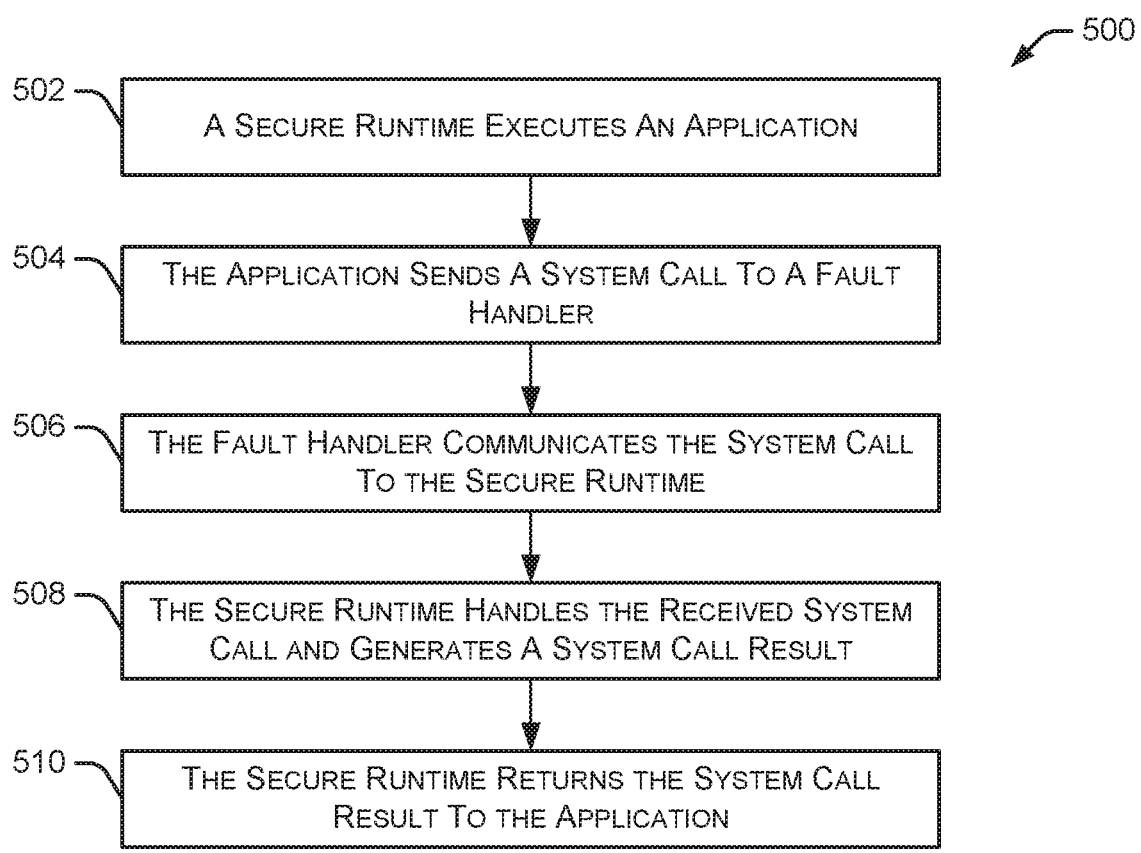
FIG. 5 illustrates an embodiment of a method for executing an application in the secure runtime.

FIG. 5 illustrates an embodiment of a method 500 for executing an application in the secure runtime. Initially, a secure runtime executes 502 an application (e.g., application 204-208 in FIG. 2). The application sends 504 a system call to a fault handler, then the fault handler communicates 506 the system call to the secure runtime. The secure runtime handles 508 the received system call and generates a system call result. The secure runtime continues by returning 510 the system call result to the application.

In some embodiments, there are two parts to the fault handler. Initially, a fault results in calling an out-of-enclave fault handler. This handler may resume execution inside the secure enclave calling a function that effectively serves as the trusted fault handler, but it cannot be invoked directly because the hardware processor does not support trusted fault handling. In other situations, the fault handler is entirely inside the secure runtime.

In some embodiments, the described systems and methods emulate the underlying OS by supporting all of the system calls used by the application and handling them correctly, such that the application has all of the required OS support.

In some embodiments, the provisioning of secret data is done by encrypting the data using a public-key generated by the secure runtime inside a secure enclave. The corresponding private key is sealed using a symmetric key that is derived within the enclave and is bound to both machine and application identities.

Figure 6:
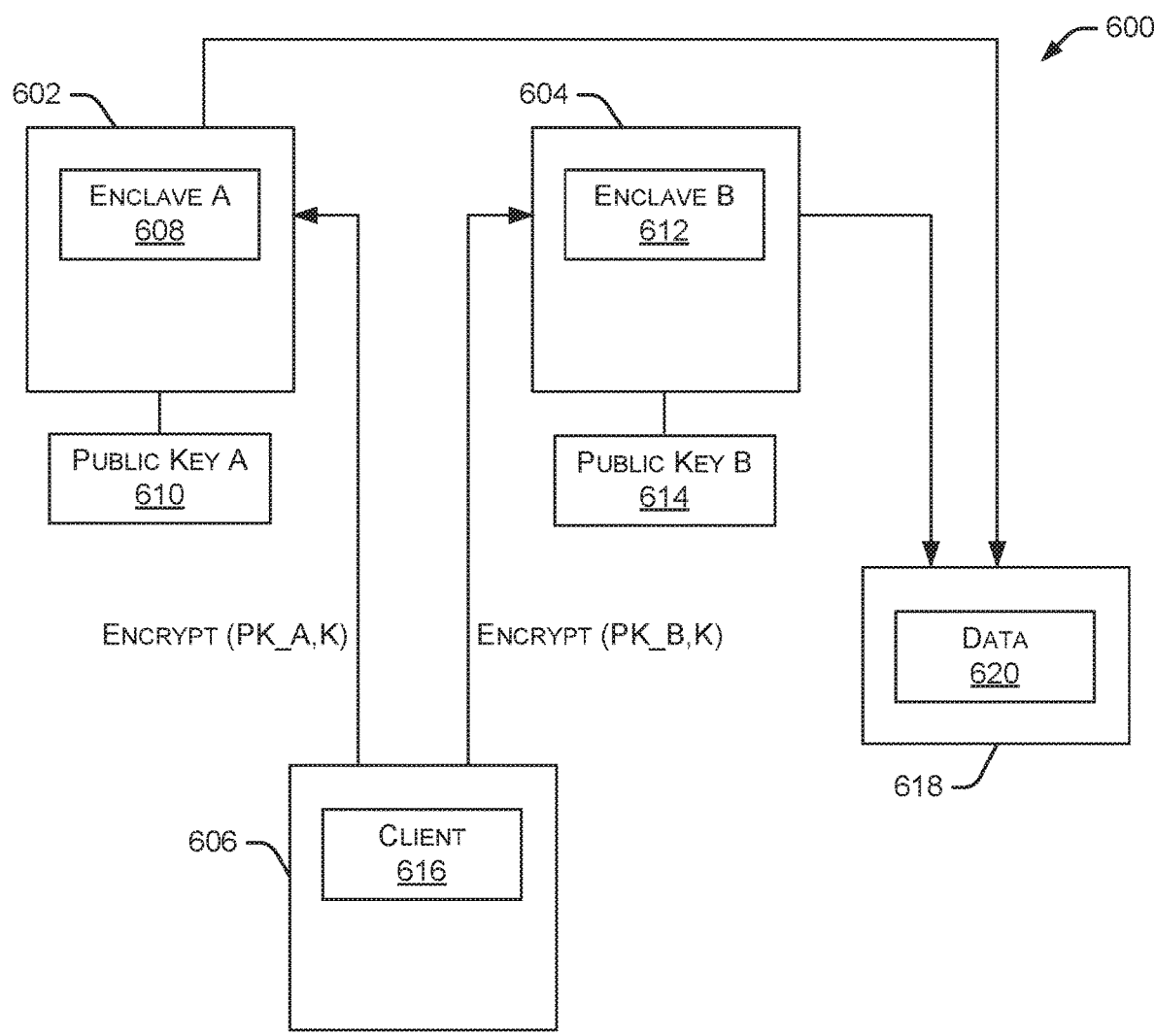
FIG. 6 is a block diagram illustrating an embodiment of multiple machines and multiple secure enclaves accessing the same data.

FIG. 6 is a block diagram illustrating an embodiment 600 of multiple machines and multiple secure enclaves accessing the same data. For example, a first machine 602 has a first secure enclave 608 and a second machine 604 has a second secure enclave 612. In some embodiments, first machine 602 and second machine 604 are processors, computing devices, or any other device or system capable of implementing a secure enclave. As shown in FIG. 6, first machine 602 has an associated public key 610 and second machine 604 has an associated public key 614.

A system or device 606 includes a client 616 and communicates with first machine 602 and second machine 604. As shown in FIG. 6, both first machine 602 and second machine 604 can access data 620 on system or device 618. System/device 606 and 618 may be any type of processor, computing device, and the like.

The embodiment of FIG. 6 introduces an additional level of indirection into the data encryption. Instead of using a one-time random key that encrypts the data, and is itself encrypted using RSA public key (e.g., RSA-KEM), the embodiment of FIG. 6 provisions an identical encryption key to multiple secure enclaves (e.g., first secure enclave 608 and second secure enclave 612). The multiple secure enclaves may be different secure enclaves on the same machine, similar secure enclaves on different machines, or different secure enclaves on different machines. The identical encryption key encrypts the keys under the public keys exported and attested by all of the different secure enclaves.

In some embodiments, the described systems and methods implement Byzantine Fault Tolerant (BFT) protocols. BFT is a property of distributed protocols that guarantees honest parties see the same state despite the presence of attackers in the peer-to-peer network. The methods and systems described herein integrate attestation into standard Transport Layer Security (TLS) authentication, which enables running a network of nodes without modifying specific source code.

In some embodiments, the described systems and methods use application attestation which allows an application to authenticate itself to a particular system, such as a remote system interacting with the application. In particular implementations, the systems and methods provide a certain secret that is used to authenticate an application using TLS. For example, the runtime can be executed with a command-line argument that generates an asymmetric encryption key-pair. The private key is stored such that it is accessible only to the same enclave on the same machine. This is accomplished by encrypting the private key with a seal-key using AES-GCM (Advanced Encryption Standard-Galois/Counter Mode) authenticated encryption. Since the key derivation takes place after the enclave is initialized, the described systems and methods are able to derive the seal-key under the MRENCLAVE policy, ensuring that only the same enclave (a combination of runtime+application+configuration) will be able to derive the same seal-key and decrypt the private key stored persistently. The encrypted private key can be persistently stored in any storage device. The public key is output in the clear and can be used by any client to encrypt data that can only be decrypted by that enclave.

Upon startup, the runtime attempts to retrieve the private key, and if such file exists, attempts to decrypt it using the symmetric seal key. If the private key is successfully retrieved, it is stored within the enclave as the data-decryption key that will be used to decrypt confidential input data and configuration from clients.

In some embodiments, the public-key hash is included as custom data as part of an attestation quote which can be verified using an attestation service or using a public-key provided by the hardware vendor. Verifying that the public-key output by the runtime hashes to the value included in the attestation quote enables verification of the authenticity of the public-key. Further, the corresponding private key is accessible only to the enclave that generated the attestation quote.

In order to enable access to data by multiple applications deployed by the same organization, or by new versions of a deployed application, the systems and methods provide an alternative way to provision data. For example, in addition to a previously generated RSA key, the runtime generates a second RSA key. The systems and methods output the public-key, seal the corresponding private key using a MRSIGNER policy, and store persistently in any storage.

In some embodiments, the systems and methods described herein provide service authentication to connecting clients. The systems and methods prove to a client that it is communicating with an authentic service executing inside a secure runtime within a secure enclave.

In some embodiments, when executing applications in a secure enclave, the systems and methods guarantee that only a particular application (executing in the secure enclave), is able to successfully attest to clients. For example, the systems and methods may provide the following security guarantees:

1. Communication with the right version of the service.
2. Ensuring that the service is protected by an up-to-date version of the secure runtime described herein.
3. Ensuring that an up-to-date version of the secure enclave system is used on the backend.

In particular implementations, the systems and methods use the hardware-backed key derivation and sealing capabilities of the secure enclave that only a service instance running with the secure runtime discussed herein can successfully establish trust with its clients. The systems and methods rely on PKI (Public Key Infrastructure) to ensure that clients only trust authentic and protected service instances. In some embodiments, a key-pair is generated and the public key is distributed (in the form of a X.509 certificate) to clients. When clients initiate a TLS connection to a service, they authenticate it using the public key. A successful authentication guarantees that the service on the other end has access to the corresponding private key. Thus, the described systems and methods ensure that a service is running with an up-to-date version of the secure runtime inside and an up-to-date version of the secure enclave can access the private key. To ensure that confidential material, such as TLS private keys, is not exposed, the systems and methods may enforce that the confidential material is only being accessed for its original purpose. For example, the systems and methods described herein may have separate encryption keys for different file roles.

The described systems and methods may be used to implement a database (or database service) using the secure runtime, while protecting the database in both in-memory situations as well as data at-rest. This prevents memory dumping attacks on the database as well as reading the storage backend. By running the entire database (or database service) in a secure enclave, the systems and methods enable the use of complex queries and running stored procedures, compared to encryption on a record basis which requires decrypting the data on the client side and is less suitable for complex queries which typically require the query engine to see the data.

The described systems and methods may be used to implement a service mesh. Commonly used components in a service mesh are sidecar proxies that provide TLS termination for applications. Examples include Envoy by Lyft and Consul by Hashicorp. Those sidecar proxies require access to the private key corresponding to the TLS certificate. If this is accessible to an adversary, the private key enables the attacker to perform fake authentication for a rogue service. The systems and methods described herein provide runtime and at-rest protection against root-level attackers for those sidecar proxies and the files containing the TLS private key.

The described systems and methods are also useful with blockchain technologies and environments. Blockchains contain signed transactions approved by users or custodian services who control their assets through possession of signing keys. Adversarial access to a host that signs transactions (whether it contains the private keys themselves, or is connected and authorized to access a Hardware Security Module that stores the keys) can enable stealing those assets/cryptocurrency or approve malicious transactions on the blockchain. By executing the applications that approve/issue transactions in the secure runtime, the described systems and methods are able to protect assets/cryptocurrency even in the case of a host compromise and adversarial root-level access to the machine.

Figure 7:
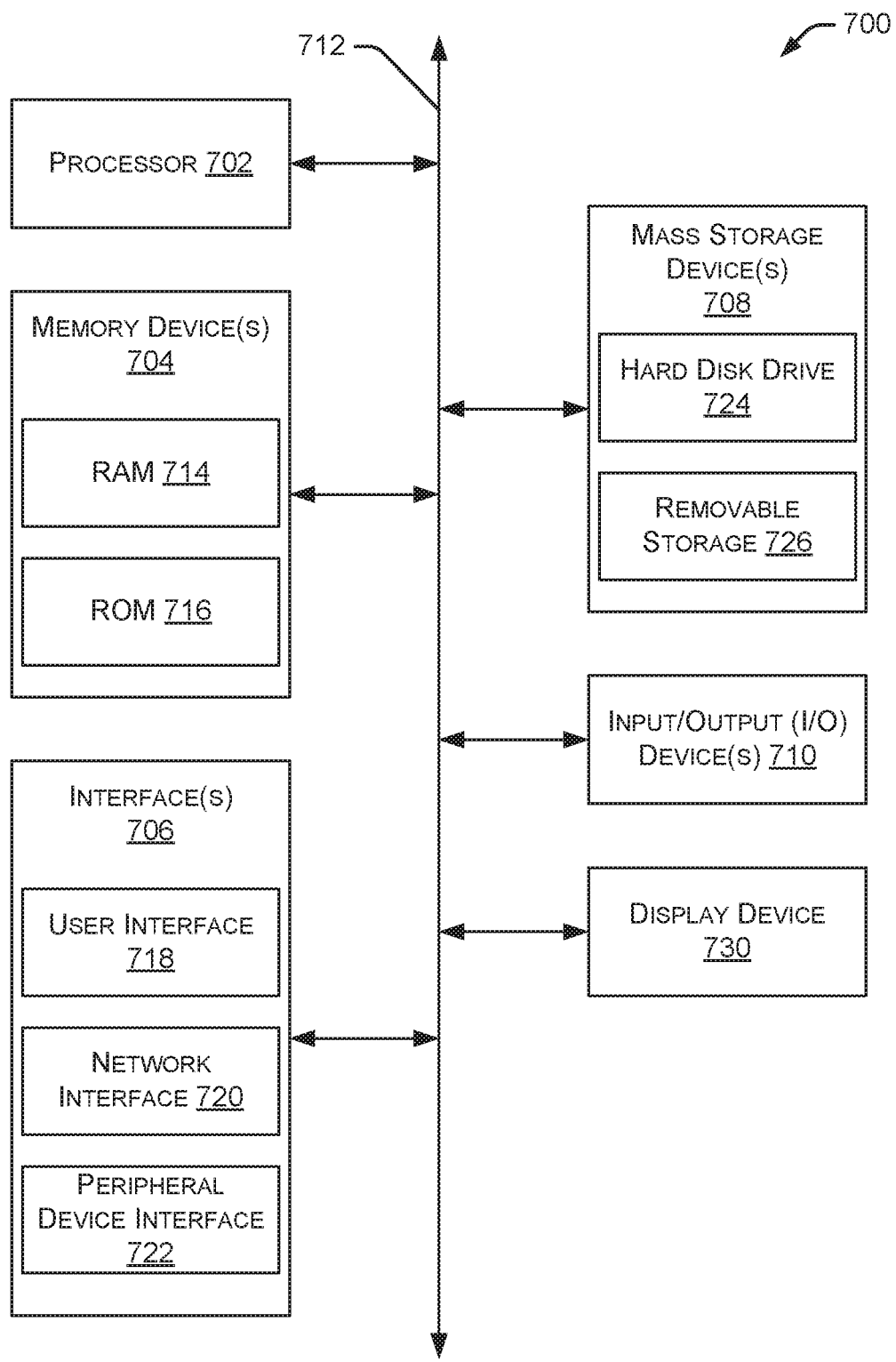
FIG. 7 illustrates an example block diagram of a computing device.

FIG. 7 illustrates an example block diagram of a computing device 700. Computing device 700 may be used to perform various procedures, such as those discussed herein. For example, computing device 700 may perform any of the functions or methods of the computing devices and systems discussed herein. Computing device 700 can perform various functions as discussed herein, and can execute one or more application programs, such as the application programs or functionality described herein. Computing device 700 can be any of a wide variety of computing devices, such as a desktop computer, a notebook computer, a server computer, a handheld computer, tablet computer, a wearable device, and the like.

Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 may include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, or any suitable user interface now known to those of ordinary skill in the field, or later discovered), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An apparatus comprising:
a secure runtime configured to execute a plurality of unmodified applications in a secure enclave, wherein the secure enclave is defined by a hardware device;
a secure application loader configured to load an unmodified application into the secure runtime; and
an OS bridge configured to provide OS services to the unmodified application.

2. The apparatus of claim 1, wherein the secure application loader is further configured to load a plurality of libraries associated with the loaded unmodified application.

3. The apparatus of claim 1, wherein the secure application loader is further configured to run binary executables in an isolated and shielded environment.

4. The apparatus of claim 1, wherein the OS bridge is further configured to encrypt data used by the loaded unmodified application such that the encrypted data is stored within the secure runtime.

5. The apparatus of claim 1, wherein the OS services may include a plurality of system calls.

6. The apparatus of claim 1, wherein the secure runtime is further configured to operate with a plurality of different types of hardware devices.

7. The apparatus of claim 1, wherein the secure runtime generates an encrypted memory partition associated with the loaded unmodified application.

8. The apparatus of claim 1, wherein executing the plurality of unmodified applications in the secure enclave includes executing each of the unmodified applications in the secure enclave.

9. The apparatus of claim 1, wherein executing the plurality of unmodified applications in the secure enclave includes executing at least two of the plurality of unmodified applications in the same secure enclave.

10. The apparatus of claim 1, wherein at least one of the plurality of unmodified applications are executed by the secure runtime without requiring any modification of the at least one unmodified application.

11. The apparatus of claim 1, wherein at least two of the plurality of unmodified applications are linked statically and directly invoke a system call instruction to be intercepted by a fault handler.

12. The apparatus of claim 11, wherein the fault handler delegates a signal indicating which system call was attempted to a trusted handler inside the secure enclave.

13. The apparatus of claim 11, wherein the secure runtime is configured to replace the system call with a second system call.

14. The apparatus of claim 11, wherein the secure runtime is configured to:
switch to a second stack when the system call instruction is invoked;
carry out the system call servicing using the second stack; and
switch back to the original stack before returning to the unmodified application.

15. The apparatus of claim 1, wherein the secure runtime implements application attestation which allows the unmodified application executing in the secure runtime to authenticate itself to another system.

16. The apparatus of claim 1, wherein a state of a particular unmodified application is bound to a secret.

17. The apparatus of claim 1, wherein the secure runtime provisions secret data by encrypting the data using a public-key generated by the secure runtime inside the secure enclave.

18. A method comprising:
loading, by a secure application loader, a system-call interception layer;
loading, by the secure application loader, an Executable and Linkable Format/Portable Executable binary;
loading, by the secure application loader, dynamically linked libraries;
initializing, by the secure application loader, an enclave; and
initiating an unmodified application in the enclave.

19. The method of claim 18, further comprising loading, by the secure application loader, an in-enclave Executable and Linkable Format/Portable Executable loader.

20. The method of claim 18, further comprising loading, by the secure application loader, a plurality of libraries associated with the unmodified application.

* * * * *